(12) United States Patent
Noro et al.

(10) Patent No.: US 6,336,327 B1
(45) Date of Patent: Jan. 8, 2002

(54) MASTER CYLINDER DEVICE FOR VEHICLES

(75) Inventors: Hirofumi Noro; Shinichi Kuwahara, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/645,874

(22) Filed: Aug. 25, 2000

(30) Foreign Application Priority Data

Aug. 27, 1999 (JP) ............................................ 11-241526

(51) Int. Cl.⁷ ................................................. B60T 7/02
(52) U.S. Cl. ............................................ 60/533; 60/594
(58) Field of Search ..................................... 60/533, 594

(56) References Cited

U.S. PATENT DOCUMENTS

| | | | | |
|---|---|---|---|---|
| 3,802,200 A | * | 4/1974 | Kolm ............................ | 60/594 |
| 3,935,930 A | * | 2/1976 | Kine ........................ | 60/584 X |
| 4,560,049 A | * | 12/1985 | Uchibaba et al. ......... | 192/85 R |
| RE33,578 E | * | 4/1991 | Bass ............................. | 60/594 |
| 5,050,381 A | * | 9/1991 | Matsuno et al. .......... | 60/594 X |
| 5,636,518 A | * | 6/1997 | Burgoyne et al. ............. | 60/594 |

FOREIGN PATENT DOCUMENTS

JP    A-59-153679    9/1984

* cited by examiner

Primary Examiner—John E. Ryznic
(74) Attorney, Agent, or Firm—Arent Fox Kintner Plotkin & Kahn, PLLC

(57) ABSTRACT

In a master cylinder device for a vehicle having a master cylinder with a cylinder body attached in the vicinity of a grip of a steering bar handle, and an operating lever which is supported on the cylinder body through a pivot and is pulled toward the grip to thereby push a piston of the master cylinder, the cylinder body is mounted in such a position that, below the axis of the bar handle, the axis of the cylinder body is substantially orthogonal to a vertical plane which includes the axis of the bar handle, whereby the master cylinder can be mounted even in a narrow space on the bar handle in a motorcycle and the like having a steering bar handle.

1 Claim, 2 Drawing Sheets

MASTER CYLINDER DEVICE FOR VEHICLES

BACKGROUND OF THE INVENTION

1. Field of the Invention

The present invention relates to an improvement in a master cylinder device for vehicles such as motorcycles, which has a master cylinder with a cylinder body thereof attached in the vicinity of a grip of a steering bar handle, and an operating lever supported by a pivot on the cylinder body for pushing a piston of the master cylinder by the turning movement toward the grip.

2. Description of the Related Art

In a conventional master cylinder device, as disclosed for instance in Japanese Patent Application Laid-open No. 59-153679, a cylinder body of a master cylinder is disposed so that the axis thereof will be in parallel with the axis of a bar handle in front of the bar handle.

In the master cylinder device with the cylinder body mounted in such a position that the axis thereof is in parallel with the axis of the bar handle as stated above, a relatively wide space is needed on the bar handle for mounting the master cylinder, enough to support the overall length of the cylinder body. This structure, however, will narrow a space provided between the right and left bar handles, imposing a limitation to the mounting of meters and switches.

SUMMARY OF THE INVENTION

The present invention has been accomplished in view of the above-described circumstances, and it is an object of the present invention to provide a master cylinder device for vehicles which enables a master cylinder to be mounted even in a narrow space on a bar handle.

To accomplish the object stated above according to the present invention, there is provided a master cylinder device for vehicles which has a master cylinder with a cylinder body thereof attached in the vicinity of a grip of a steering bar handle, and an operating lever supported by a pivot on the cylinder body, for pushing a piston of the master cylinder by the turning movement toward the grip, in which the cylinder body is positioned so that, below the axis of the bar handle, the axis of the cylinder body is substantially orthogonal to a vertical plane including the axis of the bar handle.

With the above arrangement, since the axis of the cylinder body is arranged substantially orthogonal to the vertical plane inclusive of the axis of the bar handle, the master cylinder mounting space required on the bar handle is about as large as the diameter of the cylinder body. It is, therefore, possible to substantially decrease the mounting space as compared with conventional ones, and to provide a wide space between the right and left bar handles to thereby facilitate mounting of meters and switches.

Even in the case where the axis of the cylinder body is positioned beneath the axis of the bar handle and a rearwardly inclined cowling covering the front part of the periphery of the bar handle is mounted on the vehicle frame, it is possible to easily prevent interference between the cowling and the master cylinder, thereby increasing the degree of freedom of cowling layout.

The above and other objects, features and advantages of the invention will become apparent from the following description of the preferred embodiment taken in conjunction with the accompanying drawings.

DESCRIPTION OF THE PREFERRED EMBODIMENT

One preferred embodiment of the master cylinder device according to the present invention will be described with reference to the accompanying drawings.

Figure 1:
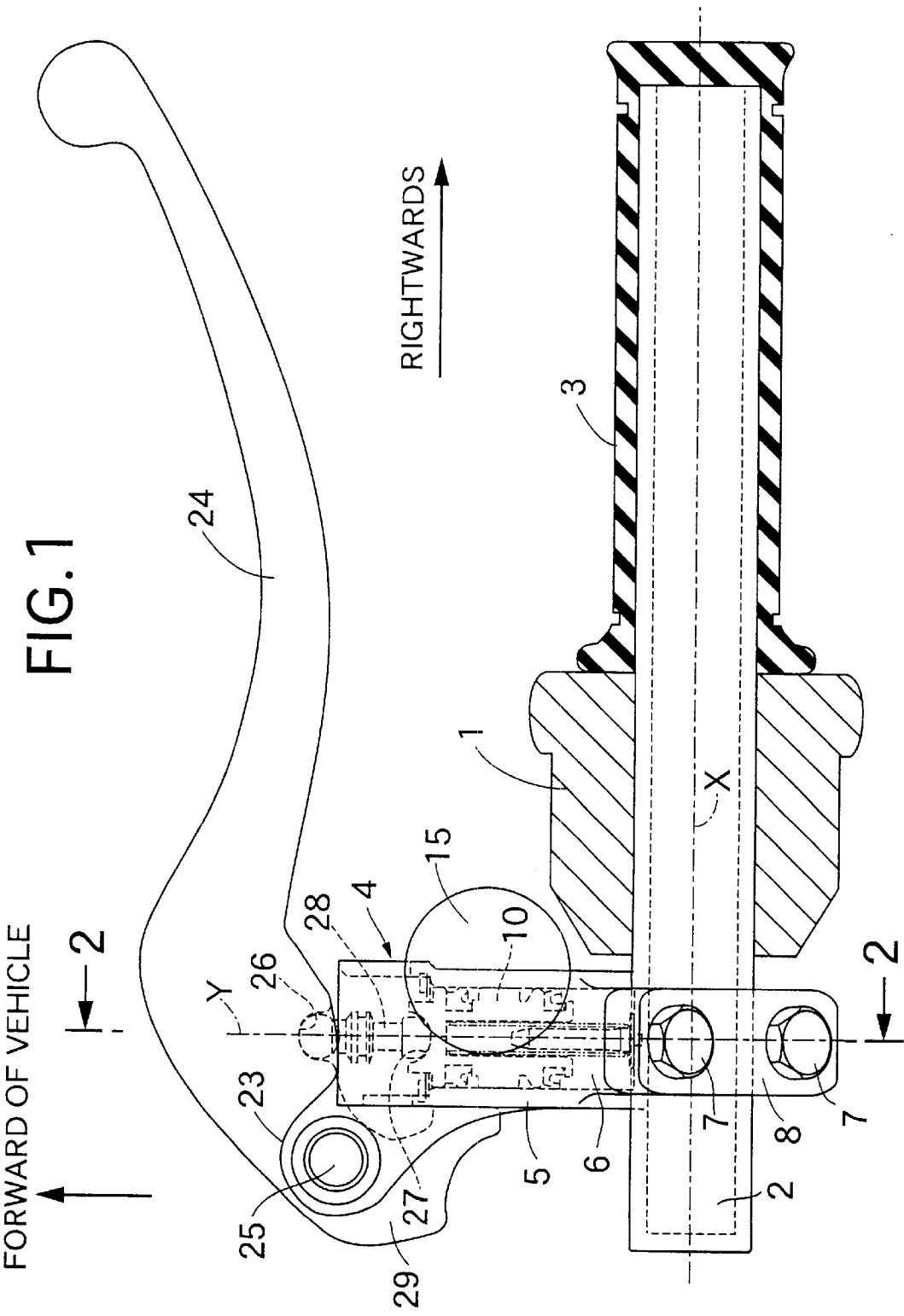
FIG. 1 is a longitudinal plan view showing an essential portion of a master cylinder device of a motorcycle according to an embodiment of the present invention.

First, in FIG. 1, a pair of right and left steering bar handles 2 (only the right bar handle is shown) are supported by a pair of right and left handlebar holders 1 (only the right handlebar holder is shown) formed on a top bridge of an unillustrated front fork of the motorcycle. Each of the bar handles 2 protrudes from the handlebar holder 1 at both of inner and outer end portions thereof. On the outer end portion, a rubber tube-shaped grip 3 is fitted. Also particularly in the inner end portion of the right bar handle 2, a master cylinder 4 for a vehicle wheel brake, for example front wheel brake is installed.

Figure 2:
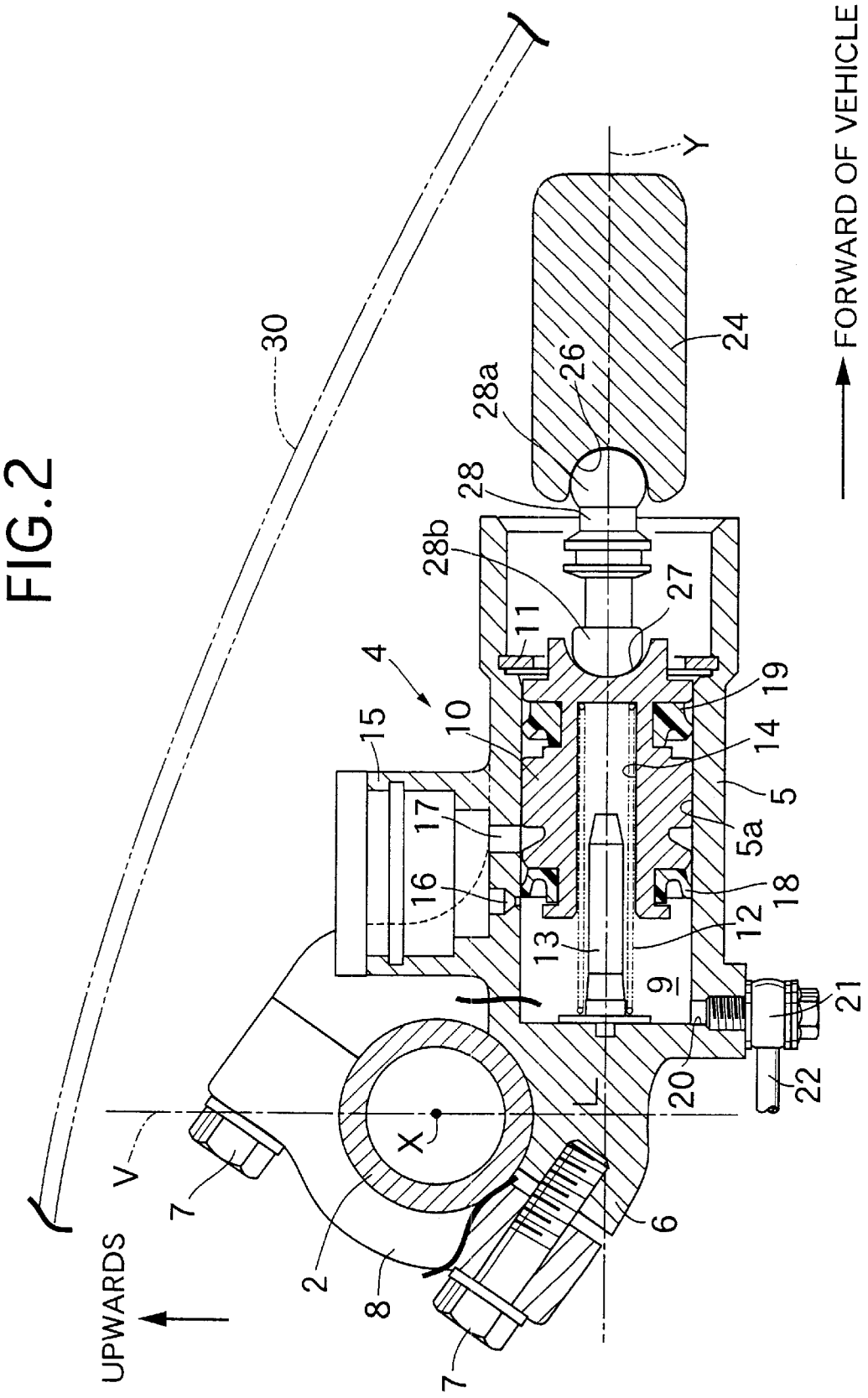
FIG. 2 is a sectional view taken along a line 2—2 of FIG. 1.

As shown in FIGS. 1 and 2, a cylinder body 5 of the master cylinder 4 is securely installed on the bar handle 2 in such a manner that, below the axis X of the bar handle 2, the axis Y thereof is substantially orthogonal to a vertical plane V including the axis X of the bar handle 2, and the cylinder body 5 protrudes forwards of the vehicle from the bar handle 2. The secure installation is effected by sandwiching the bar handle 2 between an attaching portion 6 integrally formed at the rear end of the cylinder body 5 and a cap 8 connected to the attaching portion 6 by a pair of bolts 7.

In a cylinder bore 5a of the cylinder body 5 which is open at its front end, a piston 10 is slidably fitted to define a brake fluid chamber 9. A circlip 11 for retaining the piston 10 is fitted in the inner peripheral surface of the front opening portion of the cylinder bore 5a. The piston 10 is pressed by a coil-shaped return spring 12 in the backward direction, that is, toward the front of the vehicle. The return spring 12 is supported by a guide pin 13 which is supported on an end wall of the brake fluid chamber 9, and is inserted together with the guide pin 13 into a closed end hole 14 formed in the piston 10, thereby enabling the long return spring 12 to be sufficiently contained even in the narrow brake fluid chamber 9 and besides preventing the spring 12 from bending.

Above the cylinder body 5, a reservoir tank 15 for reserving the brake fluid is integrally formed. In the bottom wall of the reservoir tank 15, a relief port 16 and a supply port 17, opening in the cylinder bore 5a, respectively, are formed by drilling.

The piston 10 is fitted on the outer periphery with a cup seal 18 on the inner end side and a seal member 19 on the outer end side. The relief port 16 is located in such a position that it will move close to the cup seal 18 to open into the brake fluid chamber 9 when the piston 10 moves back to the predetermined position. The supply port 17 is so located as to open into the cylinder bore 5a between the cup seal 18 and the seal member 19.

One end of a brake fluid conduit 22 is connected through a joint 21 to an output port 20 which is formed on one side of the cylinder body 5 and connected to the brake fluid chamber 9, while the other end is connected to a wheel brake, for example a wheel cylinder (not shown) of the front wheel brake.

At the end of the cylinder body 5 on the front side of the vehicle body, a lever holder 23 is integrally formed protruding oppositely to the handlebar holder 1. On the lever holder 23 a base end portion 24a of a brake operating lever 24 disposed on the grip 3 at the front part of the vehicle body is rotatably supported through a pivot 25 in the vertical direction. Therefore, the brake operating lever 24 can swing on the pivot 25 in the longitudinal direction of the vehicle body.

There are formed semispherical recesses 26 and 27 at both opposite sides of the brake operating lever 24 and the piston 10, respectively, so that spherical ends 28*a* and 28*b* on opposite ends of the push rod 28 are engaged with the recesses 26 and 27, respectively. The brake operating lever 24 and the piston 10 are connected to each other through the push rod 28.

A stopper arm 29 is formed integrally with the base end portion 24*a* of the brake operating lever 24. The stopper arm 29 abuts against the side surface of the cylinder body 5 on the vehicle center side, thereby restricting the backward limit positions of the brake operating lever 24 and the piston 10.

In FIG. 2, numeral 30 denotes a cowling inclined rearwardly and supported on an unillustrated vehicle frame to cover the front part of the periphery of the bar handle.

Next, operation of the master cylinder device of the present embodiment will be described.

When an operator of the motorcycle pulls the brake operating lever 24 toward the grip 3 by his or her hand grasping the grip 3, a pushing force is applied from the brake operating lever 24 to the piston 20 through the push rod 28, whereby a hydraulic pressure is generated in the brake fluid chamber 9 after the forward-moving piston 10 has passed the open end of the relief port 16. The hydraulic pressure is output from the output port 20, being supplied to an unillustrated wheel brake through the brake fluid conduit 22 to thereby operate the brake.

When the operating force is released from the brake operating lever 24, the piston 10 and the brake operating lever 24 are moved backward with the resilient force of the return spring 12. At this time, with a decrease in the brake fluid in the brake fluid chamber 9 by the rapid backward movement of the piston 10, the seal lip of the cup seal 18 deflects inward, moving away from the inner peripheral surface of the cylinder bore 5*a* to thereby supply the brake fluid into the brake fluid chamber 9 through the supply port 17. When the piston 10 has moved to the predetermined backward limit position, the relief port 16 opens to the brake fluid chamber 9. Therefore an excess amount of the brake fluid supplied to the brake fluid chamber 9 flows back into the reservoir tank 15 through the relief port 16.

In the master cylinder 4 described above, the cylinder body 5 is so arranged that the axis Y is substantially orthogonal to the vertical plane V inclusive of the axis X of the bar handle 2. Therefore, the mounting space required for the master cylinder 4 on the bar handle 2 is about as large as the diameter of the cylinder body 5, and therefore the size of the space can be substantially decreased as compared with a conventional one in which the cylinder body is disposed in parallel with the bar handle, thus ensuring a wide space between the right and left bar handles 2 to thereby facilitate the mounting of meters and switches.

Moreover, the master cylinder 4 is disposed in such a position that the axis Y of the cylinder body 5 is below the axis X of the bar handle 2. Therefore, even when the cowling 30 inclined rearwardly to cover the front part of the periphery of the bar handle 2 is mounted on the vehicle frame, it is possible to easily prevent interference of the unmovable cowling 30 with the master cylinder 4 which turns together with the bar handle 2 at the time of operation, thus increasing a degree of layout freedom of the cowling 30. Furthermore, the reservoir tank 15, when mounted on the upper side of the cylinder body 5, can be prevented from protruding upwardly of the bar handle 2, or the amount of its protrusion can be decreased. It is, therefore, possible to easily prevent interference of the cowling 30 with the reservoir tank 15.

It should be noted that the present invention is not limited to the embodiment explained above and various many modifications are possible within the scope of the invention. For example, when a large-sized reservoir tank is employed, in order to prevent the interference of the reservoir tank with the cowling 30, the reservoir tank can be mounted in an appropriate place apart from the cylinder body 5 and connected to the cylinder body 5 through a conduit. The present invention is also applicable to a clutch master cylinder mounted on the left bar handle.

What is claimed is:

1. A master cylinder device for vehicles, having a master cylinder with a cylinder body thereof attached in the vicinity of a grip of a steering bar handle, and an operating lever supported by a pivot on said cylinder body, for pushing a piston of said master cylinder by the turning movement toward said grip, in which said cylinder body is positioned so that, below the axis of said bar handle, the axis of the cylinder body is substantially orthogonal to a vertical plane including the axis of said bar handle.

\* \* \* \* \*

UNITED STATES PATENT AND TRADEMARK OFFICE
CERTIFICATE OF CORRECTION

PATENT NO.      : 6,336,327 B1                                        Page 1 of 1
DATED           : January 8, 2002
INVENTOR(S)     : Hirofumi Noro et al.

It is certified that error appears in the above-identified patent and that said Letters Patent is hereby corrected as shown below:

<u>Title page,</u>
Item [73], Assignee please add the following Assignee's name and address:

-- Nissin Kogyo Co., Nagano (JP) --.

Signed and Sealed this

Nineteenth Day of August, 2003

JAMES E. ROGAN
*Director of the United States Patent and Trademark Office*